(12) United States Patent
Chen et al.

(10) Patent No.: US 8,681,737 B2
(45) Date of Patent: *Mar. 25, 2014

(54) METHOD AND APPARATUS FOR INTER-TECHNOLOGY HANDOFF BETWEEN A PACKET DATA NETWORK AND A CIRCUIT SWITCHED NETWORK

(75) Inventors: Bonnie Chen, Desoto, TX (US);
Thomas G. Hallin, Erie, CO (US);
Apostolis K. Salkintzis, Athens (GR)

(73) Assignee: Motorola Mobility LLC, Libertyville, IL (US)

( * ) Notice: Subject to any disclaimer, the term of this patent is extended or adjusted under 35 U.S.C. 154(b) by 1365 days.

This patent is subject to a terminal disclaimer.

(21) Appl. No.: 12/055,767

(22) Filed: Mar. 26, 2008

(65) Prior Publication Data
US 2009/0080382 A1    Mar. 26, 2009

Related U.S. Application Data

(60) Provisional application No. 60/994,674, filed on Sep. 21, 2007.

(51) Int. Cl.
*H04W 4/00* (2009.01)
*H04W 36/00* (2009.01)

(52) U.S. Cl.
USPC .......................................... 370/331; 455/436

(58) Field of Classification Search
USPC ....................................................... 370/331
See application file for complete search history.

(56) References Cited

U.S. PATENT DOCUMENTS

| | | | |
|---|---|---|---|
| 6,721,565 B1 * | 4/2004 | Ejzak et al. ................... 455/436 |
| 7,251,490 B2 | 7/2007 | Rimoni | |
| 7,369,848 B2 | 5/2008 | Jiang | |
| 7,590,092 B2 * | 9/2009 | Milton et al. ................. 370/331 |
| 7,711,366 B1 | 5/2010 | O'Neil et al. | |
| 8,265,614 B2 | 9/2012 | Allen et al. | |
| 2006/0083199 A1 * | 4/2006 | Yang ............................. 370/331 |
| 2006/0109818 A1 * | 5/2006 | Ramanna et al. ............. 370/331 |
| 2006/0268781 A1 * | 11/2006 | Svensson et al. ............. 370/331 |

(Continued)

FOREIGN PATENT DOCUMENTS

WO    0182551 A2    11/2001

OTHER PUBLICATIONS

3GPP TS 23.206 V7.3.0, "Voice Call Continuity (VCC) Between Circuit Switched (CS) and IP Multimedia Subsystem (IMS); Stage 2(Release 7)", Jun. 2007, Sections 4.1, 4.5, 5.2 and 6.4.2.

(Continued)

*Primary Examiner* — Shaq Taha (57) ABSTRACT

In order to facilitate a handoff of a communication session between a legacy circuit switched network and a packet data network such as a 3GPP LTE, 3GPP2 UMB, or WiMAX network, which communication session is anchored in an IMS Voice Call Continuity Application Server (VCC AS), a Circuit Switched Proxy (CS Proxy) is provided in the packet data network that communicates with a Mobile Switching Center (MSC) of the circuit switched network. The CS Proxy allows the packet data network to communicate with the VCC AS, the MSC to communicate with the packet data network, and the MSC to communicate with the VCC AS via the packet data network, thereby allowing an exchange of handoff-related information between the packet data network and the VCC AS, the packet data network and the circuit switched network, and the circuit switched network and the VCC AS via the packet data network.

30 Claims, 7 Drawing Sheets

(56) References Cited

U.S. PATENT DOCUMENTS

| | | |
|---|---|---|
| 2007/0014281 A1 | 1/2007 | Kant |
| 2008/0020771 A1* | 1/2008 | Trayer .......................... 455/439 |
| 2008/0090570 A1 | 4/2008 | Deshpande et al. |
| 2008/0186953 A1* | 8/2008 | Buckley et al. ............... 370/352 |
| 2008/0219183 A1 | 9/2008 | Yin |
| 2009/0073936 A1* | 3/2009 | Jentz et al. .................... 370/331 |
| 2009/0086674 A1 | 4/2009 | Ejzak |
| 2010/0189072 A1* | 7/2010 | Vikberg et al. ............... 370/331 |
| 2010/0208624 A1* | 8/2010 | Vikberg et al. ............... 370/259 |

OTHER PUBLICATIONS

"3rd Generation Partnership Project; Technical Specification Group Services and System Aspects; 3GPP System Architecture Evolution; Report on Technical Options and Conclusions (Release 7)", 3GPP TR 23.882 V1.9.0, [Online] Mar. 2007, pp. 95-102, retrieved from the Internet: URL:www.3gpp.org>[retrieved on Sep. 30, 2008], p. 99, line 1-line 24.

"3rd Generation Partnership Project; Thechnical Specification Group Services and System Aspects; 3GPP System Architecture Evolution; Report on Technical Options and Conclusions (Release 7)", 3GPP TR 23.882 V1.11.0, [Online] Jul. 2007, pp. 96-110, Retrieved from the Internet: URL:www.3gpp.org> [retrieved on Sep. 30, 2008] p. 100-p. 110.

Motorola: "CS-LTE voice call continuity", 3GPP TSG SA WG2 Architechture—S2#58, [Online Jun. 29, 2007, Orlando, Florida Retrieved from the Internet: URL:www.3gpp.org> [retrieved on Sep. 30, 2008] the whole document.

3GPP Organizational Partners, "3Gpp TR 23.882 V1.8.0 (Feb. 2007), Section 7.19: Key Issue—Service Continuity at domain and RAT change for TS 11, TS 12, . . . and equivalent PS service," 3rd Generation Partnership Project, Technical Specification Group Services and System Aspects, 3GPP System Architecture Evolution, Report on Techical Options and Conclusion (Realease 7), Global System for Mobile Communications, Release 7, Cover page and pp. 92-100.

3GPP Organizational Partners, "Voice Call Continuity (VCC) between Circuit Switched (CS) and IP Mulimedia Subsystem (IMS), Stage 2," 3rd Generation Partnership Project, Technical Specification Group Services and System Aspects, (Realease 7), Global System for Mobile Communications, Release 7, 36 pages.

United States Patent and Trademark Office, "Non-Final Rejection" for U.S. Appl. No. 12/202,590 dated Jul. 13, 2012, 16 pages.

United States Patent and Trademark Office, "Notice of Allowance and Fee(s) Due" for U.S. Appl. No. 12/202,590 dated Apr. 12, 2013, 12 pages.

* cited by examiner

METHOD AND APPARATUS FOR INTER-TECHNOLOGY HANDOFF BETWEEN A PACKET DATA NETWORK AND A CIRCUIT SWITCHED NETWORK

CROSS-REFERENCE TO RELATED APPLICATION

This application claims priority from provisional application Ser. No. 60/944,674, entitled "METHOD AND APPARATUS FOR INTER-TECHNOLOGY HANDOFF OF A USER EQUIPMENT," filed Jun. 18, 2007, which is commonly owned and incorporated herein by reference in its entirety.

FIELD OF THE INVENTION

The present invention relates generally to wireless communication systems, and more specifically to handover of a user equipment between wireless communication networks implementing different air interface technologies.

BACKGROUND OF THE INVENTION

The evolution of wireless communications has resulted in a proliferation of networks of different technologies and corresponding different air interfaces. As a result, during the course of a single call, a wireless user equipment (UE) may roam among multiple radio access networks (RANs), wherein each such RAN implements a different technology than the other RANs of the multiple RANs, for example, a second generation (2G) circuit switched RAN, such as a GSM (Global System for Mobile communications) network providing primarily circuit voice service, and a packet data RAN, such as a later generation 3GPP LTE (Third Generation Partnership Project Long Term Evolution) network, a 3GPP2 UMB (Third Generation Partnership Project 2 Ultra Mobile Broadband) network, a WiMAX network, or a Wireless Fidelity network based on IEEE 802 standards, providing packet switched Voice over Internet Protocol (VoIP) and other data related services.

As the UE roams among the circuit switched RAN and the packet data RAN providing packet data services, it may be beneficial to system performance to handoff the UE between the circuit switched RAN and the packet data RAN. For example, the channel conditions associated the latter RAN may be more favorable than the channel conditions associated with the former RAN due to such factors as fading, adjacent and co-channel interference, and available power at a serving base station (BS) or radio access network (RAN). By way of another example, an operator of both a legacy circuit network and a packet data network may desire to move the UE from one such network to the other network for purposes of system load balancing. A handoff of a UE from a 2G network to a 3GPP LTE, 3GPP2 UMB, or WiMAX network is made additionally complex when the call involving the UE is currently anchored, and is desired to remain anchored, in an Internet Protocol Multimedia Subsystem (IMS). As is known in the art, IMS is supposed to be agnostic with respect to the underlying transport layer over which IMS data is conveyed.

The 3GPP LTE, 3GPP2 UMB, and WiMAX Inter RAN technology handover standards are in their infancy. As a result, no method has yet to be defined for handing off a voice session of a UE between a legacy circuit switched network, such as a GSM network, and a 3GPP LTE, 3GPP UMB, or WiMAX network. Therefore, a need exists for a method and apparatus for implementing such a handoff.

DETAILED DESCRIPTION OF THE INVENTION

To address the need that exists for a method and apparatus that implements a handoff of voice session between a legacy circuit switched network and a packet data network such as a 3GPP LTE, 3GPP2 UMB, or WiMAX network, which voice session is anchored in an IMS Voice Call Continuity Application Server (VCC AS), a Circuit Switched Proxy (CS Proxy) is provided in the packet data network that communicates with a Mobile Switching Center (MSC) of the circuit switched network. The CS Proxy allows the packet data network to communicate with the VCC AS, the MSC to communicate with the packet data network, and the MSC to communicate with the VCC AS via the packet data network, thereby allowing an exchange of handoff-related information between the packet data network and the VCC AS, the packet data network and the circuit switched network, and the circuit switched network and the VCC AS via the packet data network.

Generally, an embodiment of the present invention encompasses a method for an inter-technology handoff of a communication session from a packet data network to a circuit switched network. The method includes conveying forward link session traffic to, and receiving reverse link session traffic from, a user equipment (UE) via the packet data network, determining to hand off the communication session and, in response to determining to hand off the communication session call to the circuit switched network, conveying, by a Circuit Switched Proxy (CS Proxy) of the packet data network to the UE, information concerning a target Mobile Switching Center (MSC) of the circuit switched network. The method further includes conveying, by the UE to a Voice Call Continuity Application Server (VCC AS) and via the packet data network, the target cell identity, MSC identity and other information, instructing, by the VCC AS via the CS Proxy of the packet data network, the target MSC to prepare for a handover, and continuing to anchor the session in the VCC AS. The method further includes acquiring, by a target Base Station Subsystem (BSS) associated with the target MSC, the UE, and providing, by the target BSS the UE with communication session services.

Another embodiment of the present invention encompasses a method for inter-technology handoff of services from a circuit switched network to a packet data network. The method includes conveying forward link service traffic to, and receiving reverse link service traffic from, a UE via the circuit switched network, determining to hand off a communication session, in response to determining to hand off the communication session, conveying, by a BSS of the circuit switched network to n MSC of the circuit switched network, a request to hand off the communication session call to the packet data network, and in response to receiving the handoff request, conveying, by the MSC to a CS Proxy of the packet data network, a request to prepare for a handoff. The method further includes exchanging handover information by the CS Proxy with an Internet Protocol Multimedia Subsystem (IMS) VCC AS, providing, by the CS Proxy to the MSC, handover information received from the VCC AS, continuing to anchor the session in the VCC AS, instructing, by the circuit switched network, the UE to access the packet data network, acquiring the UE by a Radio Access Network of the packet data network, and providing, by the packet data network, the user equipment with services.

Yet another embodiment of the present invention encompasses an apparatus that provides for inter-technology handoff of services between a circuit switched network and a packet data network. The apparatus includes a CS Proxy capable of operating in the packet data network and that includes a processor that is adapted to exchange inter-mobile switching center signaling with a MSC of the circuit switched network and to exchange handover-related signaling with an IMS VCC AS.

Yet another embodiment of the present invention encompasses an MSC that that supports a circuit switched voice call and that comprises a means for exchanging inter-mobile switching center signaling with a CS Proxy of a packet data network.

Still another embodiment of the present invention encompasses a Voice Call Continuity Application Server that is adapted to exchange Mobile Application Part messaging with a Circuit Switched Proxy of a packet data network.

Figure 1:
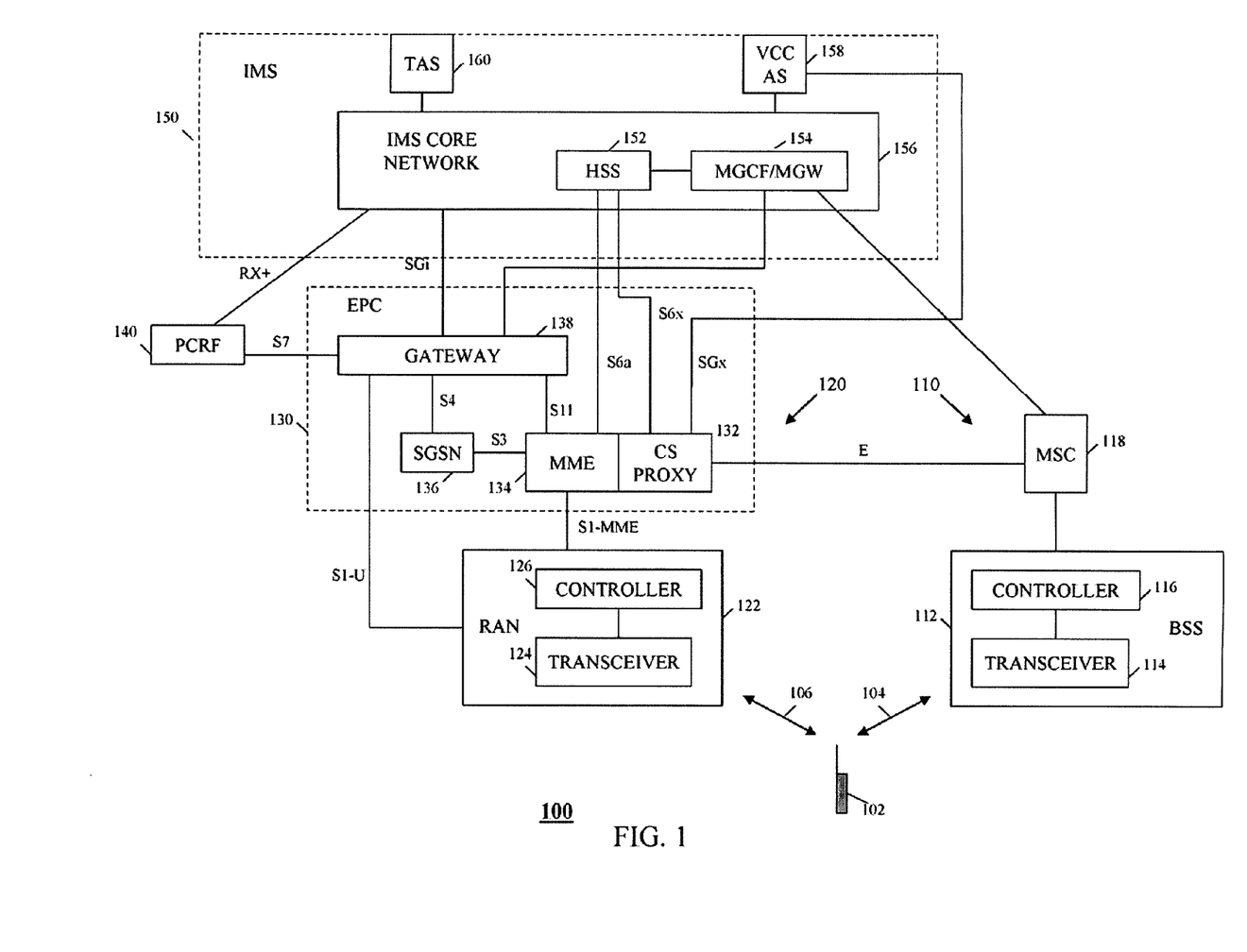
FIG. 1 is a block diagram of a wireless communication system in accordance with various embodiments of the present invention.

Turning now to the drawings, the present invention may be more fully described with reference to FIGS. 1-7. FIG. 1 is a block diagram of a wireless communication system 100 in accordance with various embodiments of the present invention. Communication system 100 includes a wireless user equipment (UE) 102, for example but not limited to a cellular telephone, a radiotelephone, or a Personal Digital Assistant (PDA), personal computer (PC), or laptop computer equipped for wireless voice communications. UE 102 is capable of engaging in a packet data voice call with a packet data network 120 and is further capable of engaging in a circuit voice call with a circuit switched network 110, and more particularly is capable of communicating with a Radio Access Network (RAN) 122 of the packet data network, preferably via the 3GPP LTE (Third Generation Partnership Project Long Term Evolution) protocol, and with a BSS 112 of the circuit switched network, preferably via a legacy protocol such as the GSM (Global System for Mobile communications) protocol.

Circuit switched network 110 includes Base Station Subsystem (BSS) 112, which BSS is coupled to a Mobile Switching Center (MSC) 118. BSS 112 comprises a transceiver 114, for example, a Base Transceiver Station (BTS), operably coupled to a controller 116, for example, a Base Station Controller (BSC). MSC 118 includes a call control and mobility management functionality (not shown) and a switching functionality (not shown).

Packet data network 120 includes a Radio Access Network (RAN) 122, such as an E-UTRAN (Evolved Universal Terrestrial Radio Access Network) that comprises a transceiver 124, such as an evolved Node B, coupled to a controller 126, such as a Radio Network Controller (RNC). However, in other embodiments of the present invention, the functionality performed by the transceiver and controller may be performed by a single entity. RAN 122 is coupled to a Gateway 138 and a Mobility Management Entity (MME) 134. Preferably, Gateway 138 comprises one or more of a Serving Gateway (Serving GWG) (not shown) and a Public Data Network (PDN) Gateway (not shown). Circuit Switched Proxy (CS Proxy) 132 functionality can be included in a MME 134 or in other embodiments of the present invention CS Proxy 132 may be separate from the MME. CS Proxy 132 further is coupled to MSC 118 via an 'E' interface, to a Home Subscriber Server (HSS) 152 via an 'S6x' interface for retrieving, among other information, Voice Call Continuity Application Server information from the HSS, and to a Voice Call Continuity Application Server (VCC AS) 158 via an 'SGx' interface. CS Proxy 132 emulates an MSC, that is, appears to MSC 118 to be another MSC and provides circuit switched handover functionality between circuit switched network 110 and packet data network 120. From another perspective, CS Proxy 132 provides circuit switched network functionality in packet data network 120, allowing circuit switched network 110 and packet data network 120 to communicate with each other via the 'E' interface and by use of an inter-system protocol such as Mobile Application Part (MAP). CS Proxy 132 further facilitates communications between MSC 118 and VCC AS 158 via packet data network 120. MME 134 is further coupled to Gateway 138 via an 'S11' interface and to a Serving GPRS Support Node (SGSN) 136 via an 'S3' interface. Gateway 138 is further coupled to SGSN 136 via an 'S4' interface and to a Policy Control and Charging Rules Function (PCRF) 140 via an 'S7' interface. Together, CS Proxy 132, MME 134, SGSN 136, and Gateway 138 are collectively referred to herein as an Evolved Packet Core (EPC) 130 of packet data network 120.

Each of circuit switched network 110 and packet data network 120 is coupled to an IP Multimedia Subsystem (IMS) 150. MSC 118 of circuit switched network 110 is coupled to IMS 150, more particularly to a Media Gateway Control Function (MGCF)/Media Gateway (MGW) 154 of IMS 150 via a bearer interface, for example, a Pulse Code Modulation over Time Division Multiplexing (PCM over TDM) interface, and a signaling interface, for example, an ISDN User Part (ISUP) interface. In various embodiments of the present invention, MGCF/MGW 154 may be implemented in a same network entity or in separate network entities. MME 134 is coupled to IMS 150, and preferably to a HSS 152 of IMS 150 via an 'S6a' interface. Gateway 138 has a signaling and bearer connection with IMS 150 via an 'SGi' interface, and PCRF 140 is coupled to IMS 150 via an 'Rx+' interface.

IMS 150 includes an IMS core network 156, comprising HSS 152, MGCF/MGW 154, and other network entities such as a Call Session Control Function (CSCF) (not shown), and multiple application servers, including a VCC AS 158 and a Telephony Application Server (TAS) 160 that are accessible via the IMS core network. In addition to being coupled to MSC 118, MGCF/MGW 154 is further coupled to EPC 130, and in particular to Gateway 138, and provides a gateway for each of circuit switched network 110 and packet data network 120 to IMS 150. Gateway 138 may be further coupled to HSS 152 via a Call Session Control Function (CSCF) (not shown) of the IMS core network. When UE 102 is engaged in a voice call with circuit switched network 110 that is anchored in IMS 150, MGCF/MGW 154 may convert Pulse Code Modulation (PCM) signals received from MSC 118 to data packets, for example, based on a Real Time Protocol/User Datagram Protocol/Internet Protocol (RTP/UDP/IP) protocol suite, for routing in the IMS network and may convert voice data received from the IMS network to a PCM over TDM (Time Division Multiplex) format for routing to MSC 1 18.

The above-listed interfaces, with the exception of the 'E,' 'SGx,' and 'S6x' interfaces, are all known in the art and will not be described in greater detail herein. Furthermore, although single interfaces have been described herein between many of the network elements of communication system 100, each interconnection among elements may comprise multiple interconnections and/or interfaces, such as one or more of a signaling interface, for example, an interface for an exchange of SIP, ISUP, MAP, or Megaco messages, and a bearer interface or path, such a path for an exchange of voice information.

Each of BSS 112 and RAN 122 provides wireless communication services to users equipment (UEs) located in a coverage area of the BSS or RAN via a respective air interface 104, 106. Each air interface 104, 106 includes a forward link that includes a pilot channel, at least one forward link traffic channel, and forward link common and dedicated signaling channels. Each air interface 104, 106 further includes a reverse link that includes at least one reverse link traffic channel, reverse link common and dedicated signaling channels, and an access channel.

Figure 2:
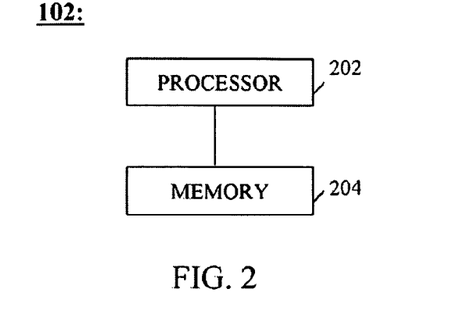
FIG. 2 is a block diagram of a user equipment of FIG. 1 in accordance with an embodiment of the present invention.

Referring now to FIG. 2, an architecture of UE 102 is provided in accordance with an embodiment of the present invention. UE 102 includes a processor 202, such as one or more microprocessors, microcontrollers, digital signal processors (DSPs), combinations thereof or such other devices known to those having ordinary skill in the art, which processor is configured to execute the functions described herein as being executed by UE 102. UE 102 further includes an at least one memory device 204, such as random access memory (RAM), dynamic random access memory (DRAM), and/or read only memory (ROM) or equivalents thereof, that is coupled to the processor and that maintains data and programs that may be executed by the associated processor and that allows the UE to perform all functions necessary to operate in communication system 100. UE 102 may maintain preprogrammed information in the at least one memory device 204 that facilitates a switching between networks 110 and 120.

Figure 3:
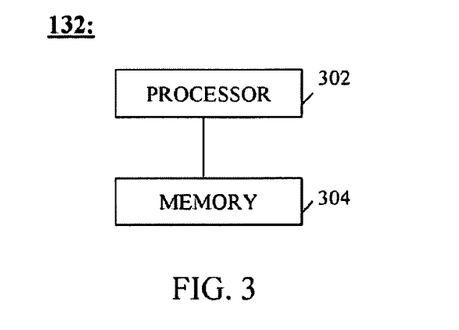
FIG. 3 is a block diagram of a Mobility Management Entity/Circuit Switched Proxy of FIG. 1 in accordance with an embodiment of the present invention.

Referring now to FIG. 3, an architecture of MME 134/CS Proxy 132 is provided in accordance with an embodiment of the present invention. The MME/CS Proxy include a processor 302, such as one or more microprocessors, microcontrollers, digital signal processors (DSPs), combinations thereof or such other devices known to those having ordinary skill in the art, which processor is configured to execute the functions described herein as being executed by the MME/CS Proxy. The MME/CS Proxy further include an at least one memory device 304 that may comprise random access memory (RAM), dynamic random access memory (DRAM), and/or read only memory (ROM) or equivalents thereof, that maintain data and programs that may be executed by the associated processor and that allow the MME/CS Proxy to perform all functions necessary to operate in communication system 100. At least one memory device 304 further maintains configuration information of neighboring MSCs, such as MSC 118, for facilitating handoffs to or from such MSCs. For example, such configuration information may include routing information for routing information to such MSCs, protocols supported by such MSCs, and identifiers of the BSSs supported by such MSCs, such as identifiers of the transceivers and/or controllers included in the BSSs. Preferably, CS Proxy 132 is implemented by processor 302 based on programs and data maintained by at least one memory device 304. However, in another embodiment of the present invention, CS Proxy 132 may be included in a network entity separate from MME 134. In the latter instance, CS Proxy 132 includes its own processor and associated at least one memory device that maintains data and programs that may be executed by the processor and that allow the CS Proxy to perform all functions necessary to operate in communication system 100, and the configuration information described above as being maintained by MME 132 may, instead, be maintained by the at least one memory device of the CS Proxy or may be distributed between the MME and the CS Proxy.

Figure 4:
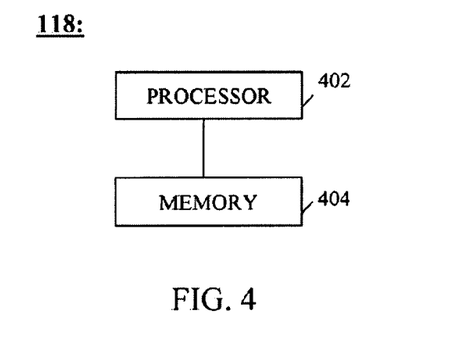
FIG. 4 is a block diagram of a Mobile Switching Center of FIG. 1 in accordance with an embodiment of the present invention.
Figure 7:
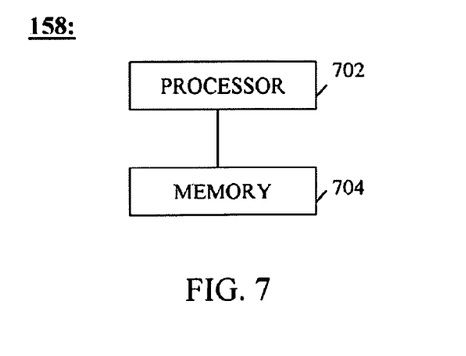
FIG. 7 is a block diagram of a Voice Call Continuity Application Server of FIG. 1 in accordance with an embodiment of the present invention.

Referring now to FIGS. 4 and 7, architectures of MSC 118 and VCC AS 158 are provided in accordance with an embodiment of the present invention. Each of MSC 118 and VCC AS 158 includes a respective processor 402, 702, such as one or more microprocessors, microcontrollers, digital signal processors (DSPs), combinations thereof or such other devices known to those having ordinary skill in the art, which processor is configured to execute the functions described herein as being executed by MSC 118 and VCC AS 158. Each of MSC 118 and VCC AS 158 further includes a respective at least one memory device 404, 704 such as random access memory (RAM), dynamic random access memory (DRAM), and/or read only memory (ROM) or equivalents thereof, that is coupled to the processor and that maintains data and programs that may be executed by the associated processor and that allows the MSC and VCC AS to perform all functions necessary to operate in communication system 100.

The functionality described herein as being performed by UE 102, MME 134, CS Proxy 132, MSC 118, and VCC AS 158 is implemented with or in software programs and instructions stored in the respective at least one memory device 204, 304, 404, 704 associated with the UE, MME, CS Proxy, MSC, and VCC AS and executed by a processor 202, 302, 402, 702 associated with the UE, MME, CS Proxy, MSC, and VCC AS. However, one of ordinary skill in the art realizes that the embodiments of the present invention alternatively may be implemented in hardware, for example, integrated circuits (ICs), application specific integrated circuits (ASICs), and the like, such as ASICs implemented in one or more of the UE, MME, CS Proxy, MSC, and VCC AS. Based on the present disclosure, one skilled in the art will be readily capable of producing and implementing such software and/or hardware without undo experimentation.

In order for UE 102 to engage in a circuit services voice call or a packet data voice call via circuit switched network 110 or packet data network 120, respectively, each of UE 102, circuit switched network 110, and packet data network 120 operates in accordance with known wireless telecommunications protocols. Circuit switched network 110 preferably is a legacy communication system that provides circuit switched communication services to subscribers serviced by the network (it may also provide packet data services) and that operates in accordance with the GSM standards or later generations of the GSM standards. Packet data network 120, as illustrated herein, is a 3GPP LTE communication system that provides packet data communication services to subscribers serviced by the network; however, other applicable packet data networks include 3GPP2 UMB and WiMAX packet data networks. To ensure compatibility, radio system parameters and call processing procedures are specified by the standards, including call processing steps that are executed by an UE and a base station subsystem or other access network serving the UE and between the base station subsystem or other access network and associated infrastructure. However, those of ordinary skill in the art realize that packet data network 120 may operate in accordance with any one of a variety of wireless packet data communication systems that supports multimedia packet data-based communication sessions, such as the IEEE (Institute of Electrical and Electronics Engineers) 802.xx standards, for example, the 802.11, 802.15, or 802.16 or 802.20 standards, and that circuit switched network 110 may operate in accordance with any one of a variety of well-known legacy wireless telecommunication systems that provide circuit switched communication services.

In communication system 100, when UE 102 is engaged in a voice call with one of circuit switched network 110 and packet data network 120, the UE may roam through the system. As a result of the roaming, situations may arise where it is desirable to hand off UE 102 from one of circuit switched network 110 and packet data network 120 to the other network. For example and as is known in the art, while roaming in communication system 100 and being serviced by BSS 112, UE 102 may receive a stronger signal from RAN 122. And similarly, while roaming in communication system 100 and being serviced by RAN 122, UE 102 may receive a stronger signal from BSS 112. Typically signal strengths are determined by a UE, such as UE 102, measuring a pilot channel associated with the RAN or BSS. When a pilot channel of a serving RAN or BSS is weaker than a threshold value and a pilot channel of another RAN or BSS, that typically indicates a desirability of a handoff.

By way of another example, the costs associated with operating UE 102 on circuit switched network 110 may be different from the costs associated with operating UE 102 on packet data network 120. In turn, an operator (or operators) of networks 110 and 120 may charge a different fee for use of each network. As a result, a user of UE 102 may set a user preference to operate on the lower cost network whenever the UE is able to obtain a traffic channel in the lower cost network. When UE 102 is engaged in a voice call in a higher cost network and is able to obtain a traffic channel in the lower cost network, the UE, or the user of the UE if the user is informed of the availability of a traffic channel in the lower cost network, may initiate a handoff to the lower cost network. By way of yet another example, it may be desirable to move a UE, such as UE 102, that is actively engaged in a voice call in circuit switched network 110 to packet data network 120 when the user of UE 102 prefers to use video telephony service rather than a voice call, and packet data network 120 supports video telephony but circuit switched network 110 does not. By way of still another example, for load balancing purposes, for network cost consideration purposes, or due to a need to clear traffic channels in a coverage area in order to facilitate emergency communications, an operator of a communication system such as communication system 100 may find it desirable to move an UE, such as UE 102, that is actively engaged in a voice call in one of circuit switched network 110 to the packet data network 120 or vice versa.

In order to facilitate a handoff of a UE, such as UE 102, communication system 100 provides a method and apparatus for an active handoff of the UE between circuit switched network 110 and packet data network 120 when the UE is actively engaged in a communication session, which may comprise a voice call, and/or a non-voice call, such as video, in either network. By providing for an active handoff of a communication session between circuit switched network 110 and packet data network 120, communication system 100 assures that the UE is actively engaged in a communication session with at least one of networks 110 and 120 at nearly all times, thereby minimizing the likelihood that voice or data traffic may be lost during the handoff.

Figure 5A:
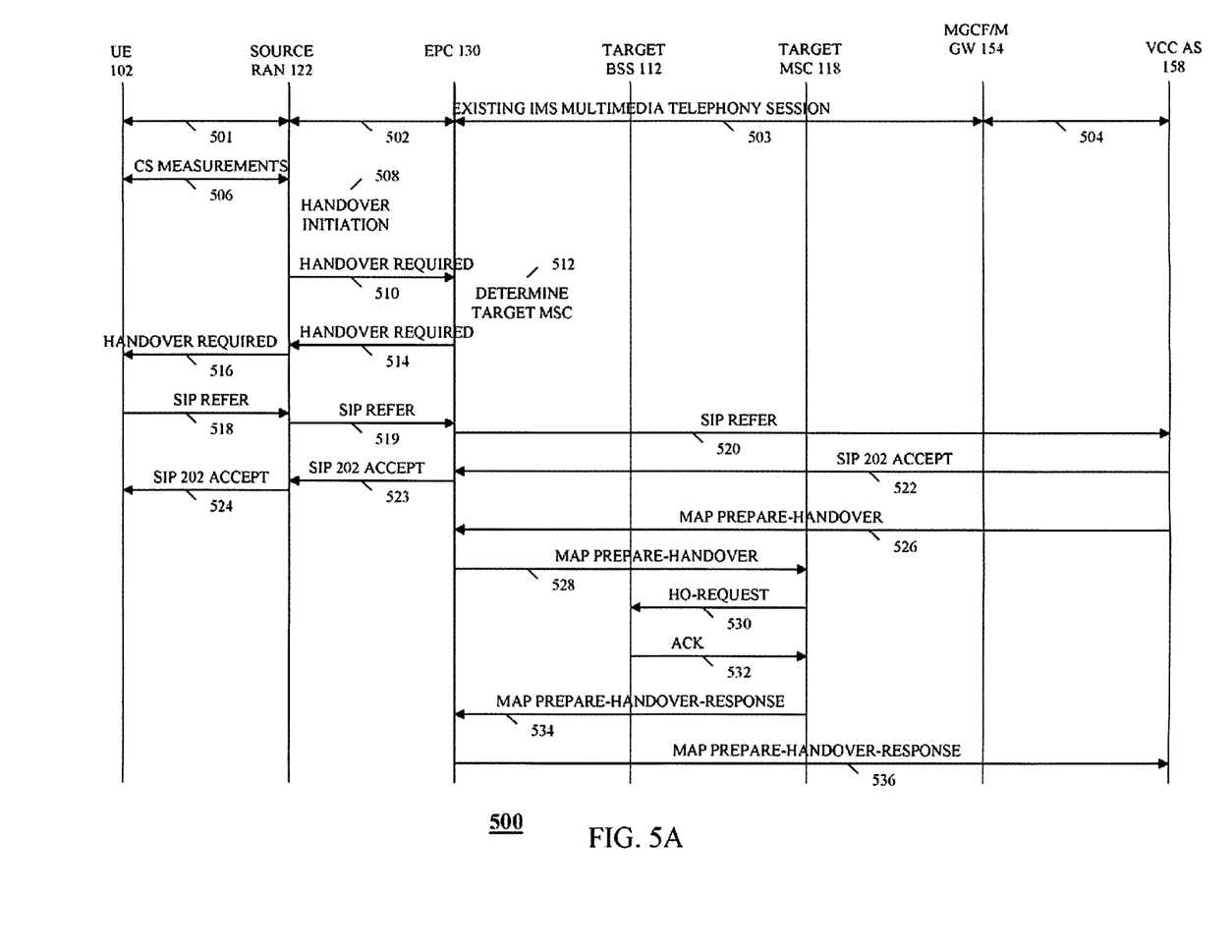
FIG. 5A is a signal flow diagram of a method executed by the communication system of FIG. 1 in handing off a voice call from a packet data network of FIG. 1 to a circuit switched network of FIG. 1 in accordance with various embodiments of the present invention.
Figure 5B:
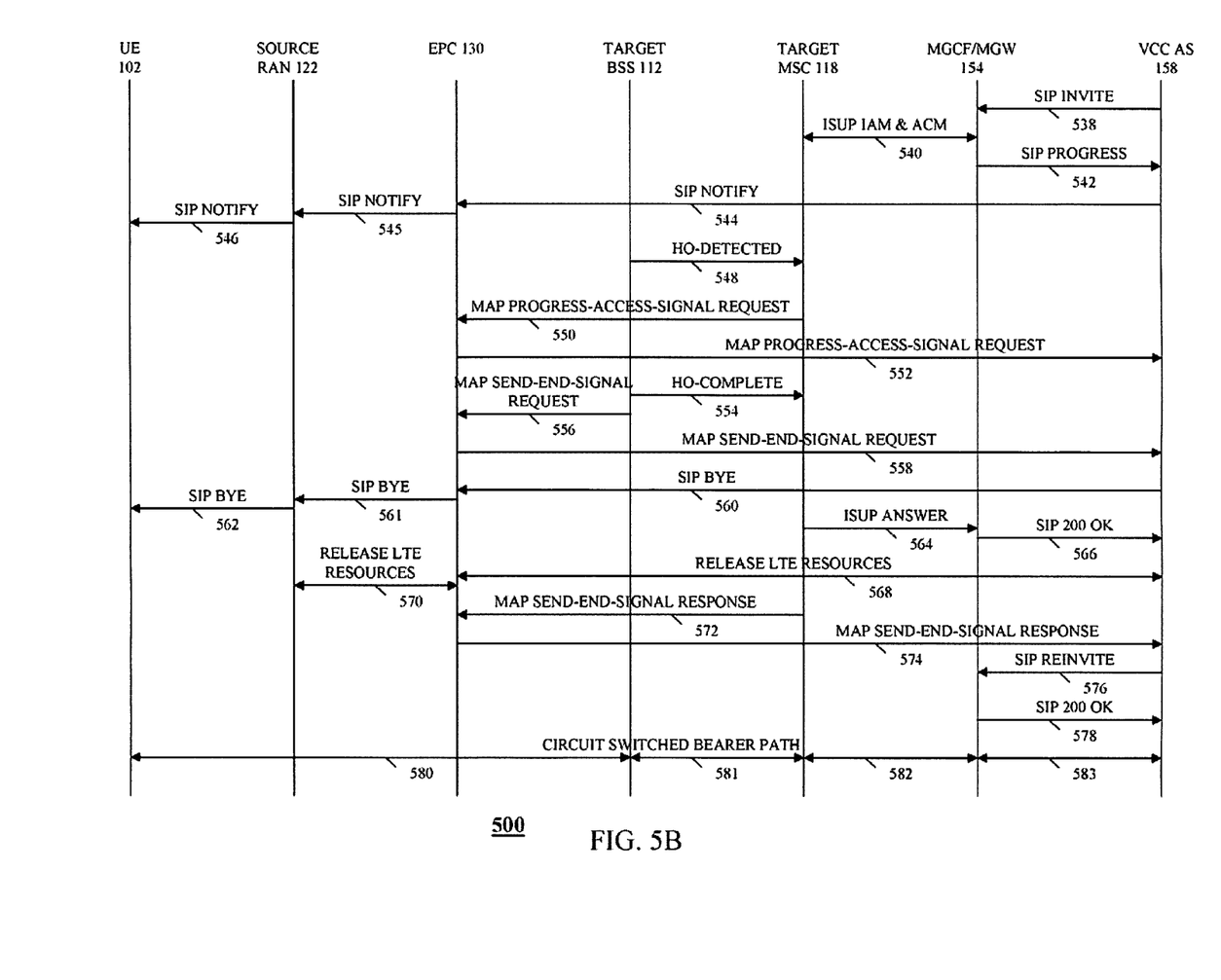
FIG. 5B is a continuation of the signal flow diagram of FIG. 5A depicting a method executed by the communication system of FIG. 1 in handing off a voice call from a packet data network of FIG. 1 to a circuit switched network of FIG. 1 in accordance with various embodiments of the present invention.

Referring now to FIGS. 5A and 5B, a signal flow diagram 500 is provided that illustrates a method executed by communication system 100 in handing off UE 102 from packet data network 120 to circuit switched network 110 in accordance with various embodiments of the present invention. Signal flow diagram 500 begins when UE 102 is engaged in an IMS telephony session (501-504) via packet data network 120 that is controlled by IMS 150, and in particular is anchored at VCC AS 158. UE 102 communicates with VCC AS 158 via RAN 122, EPC 130, and MGCF/MGW 154.

While UE 102 is in an active communication session, such as a voice call, with a remote party (not shown) via packet data network 120, the UE monitors (506) qualities, in particular a signal strength or alternatively any of a variety of other signal qualities such as a signal-to-noise ratio (SNR), a carrier-to-interference ratio (C/I), pilot power-to-total power (Ec/Io) ratio, a bit error rate (BER), or a frame error rate (FER), of pilots associated with each of RAN 122 of packet data network 120 and BSS 112 of circuit switched network 110. UE 102 may monitor the pilots of each network 110, 120 concurrently or may switch between networks in monitoring the pilots. UE 102 may self-determine when or whether to monitor the pilots associated with BSS 112 of circuit switched network 110 or may monitor the pilots in response to receiving an instruction to do so from packet network 120.

UE 102 reports (506) the monitored pilot(s) in accordance with well known reporting procedures. For example, when a quality of a pilot of circuit switched network 110, and more particularly of air interface 104, is measured by UE 102 when operating in packet data network 120 and exceeds an inter-system handoff threshold, or a quality of a previously reported pilot of packet data network 120, and more particularly of air interface 106, is measured by UE 102 when operating in packet data network 110 and falls below an intra-system handoff threshold, the UE may report the monitored pilot(s) back to RAN 122, and in particular to controller 126. Controller 126 then stores the reported pilot measurements.

Based on the pilot measurements associated with RAN 122 and BSS 112 and reported by UE 102, packet data network 120, and in particular RAN 122, may determine (508) to handoff UE 102 to circuit switched network 110 and BSS 112. For example, when a pilot of RAN 122 compares unfavorably to (is below, in the case of a signal strength threshold) the intra-system handoff threshold and/or a pilot of BSS 112 compares favorably to (exceeds, in the case of a signal strength threshold) the inter-system handoff threshold, this may indicate a desirability of a handoff. By way of another example, costs associated with operating UE 102 on network 110 may be different from the costs associated with operating UE 102 on network 120. In turn, an operator (or operators) of networks 110 and 120 may charge a different fee for use of each network. If circuit switched network 110 is the lower cost network, a user of UE 102 may program into the UE a directive to operate on the circuit switched network 110 whenever a measurement of a pilot associated with the circuit switched network compares favorably to the inter-system handoff threshold. By way of still another example, for load balancing purposes, for network cost consideration purposes, or due to a need to clear traffic channels in a coverage area in order to facilitate emergency communications, an operator of communication system 100 may find it desirable to move a UE, such as UE 102, that is actively engaged in a communication session in packet data 120 to circuit switched network 110 whenever a measurement of a pilot associated with the circuit switched network compares favorably to the inter-system handoff threshold.

In response to determining to handoff UE 102 from packet data network 120 and RAN 122 to circuit switched network 110 and BSS 112, RAN 122 assembles a request to handoff the communication session that includes the measurements, that identifies a target BSS, that is, BSS 112, and that further identifies the UE to be handed off, that is, UE 102. RAN 122 then conveys (510) this request to EPC 130, and in particular to MME 134. Based on the received request and with reference to the configuration information maintained by the MME 134, the MME determines (512) the target MSC, that is MSC 118, and assembles, and conveys (514, 516) back to UE 102, a response to the handover request via RAN 122. The response includes an identifier of the target cell or sector, that is, the cell or sector serviced by BS 112, and in particular transceiver 114, an identifier of target MSC 118, such as an MSC number or other routing information, based on the configuration information in MME 134, and an identifier of CS Proxy 132, such as a directory number, for example, an E.164 number, or other routing-related information, associated with the CS Proxy. However, in another embodiment of the present invention, the CS Proxy identifier may be provided to UE 102 when the UE registers with packet data network 120.

In response to receiving the handover request response from MME 134, UE 102 assembles, and conveys (518-520) to VCC AS 158 via packet data network 120, that is, via RAN 122 and EPC 130, in particular Gateway 138, a SIP (Session Initiation Protocol) REFER message that includes the target cell or sector identifier, the identifier of target MSC 118, a VCC AS PSI (Public Service Identity), the CS Proxy identifier, and Authentication, Authorization, and Accounting (AAA) information which is required to handover to the 2G CS domain. The CS Proxy identifier identifies the CS Proxy that the VCC AS is to talk to, that is, CS Proxy 132, since, in the prior art, a VCC AS is unable to talk directly to an MME due to protocol incompatibilities. Preferably, UE 102 conveys the SIP REFER message to VCC AS 158 by encapsulating the SIP message in an IP data packet that is conveyed over a user plane connecting the UE to the VCC AS. In response to receiving the SIP REFER message, VCC AS 158 acknowledges (522-524), to UE 102, an acceptance of the proposed handover, preferably by assembling, and conveying to UE 102 via packet data network 120, that is, via EPC 130, in particular Gateway 138, and RAN 122, a SIP 202 ACCEPT message.

Further, in response to receiving the SIP REFER message, VCC AS 158 instructs MSC 118, via CS Proxy 132, to prepare for a handover. That is, in response to receiving the SIP REFER message, VCC AS 158 assembles, and conveys (526) to CS Proxy 132, a MAP PREPARE-HANDOVER message. MAP is a circuit switch network protocol that may be used for inter-MSC communications. By including CS Proxy 132 in packet data network 120, each of VCC AS 158 and MSC 118 is able to talk to the packet data network, and to CS Proxy 132 in particular, and further are able to talk to each other via the packet data network.

The MAP PREPARE-HANDOVER message assembled by VCC AS 158 includes the CS Proxy identifier, the MSC identifier, and AAA information. In response to receiving the MAP PREPARE-HANDOVER message, CS Proxy 132 conveys (528) a MAP PREPARE-HANDOVER message to target MSC 118 that includes the CS Proxy identifier and AAA information. In one embodiment of the present invention, CS Proxy 132 may forward the MAP PREPARE-HANDOVER message received from VCC AS 158, with or without the CS Proxy identifier; however, in another embodiment of the present invention, CS Proxy 132 may assemble and convey another MAP PREPARE-HANDOVER message that includes some or all of the information received from VCC AS 158.

In response to receiving the MAP PREPARE HANDOVER message, MSC 118 assembles and conveys (530) a handover request, preferably a HO-REQUEST message, to target BSS 112 and, in response, receives (532) an acknowledgement of the request from the BSS. MSC 118 further conveys (534) a MAP PREPARE HANDOVER RESPONSE message to CS Proxy 132 that includes a handover number (HO#) for establishment of a circuit connection between the MSC and MGCF/MGW 154, and in particular the MGW, a handover command (HO_CMD), and the VCC AS identifier that identifies an application running on the VCC AS that is anchoring the communication session, or call. In response to receiving the MAP PREPARE-HANDOVER-RESPONSE message, CS Proxy 132 conveys (536) a MAP PREPARE-HANDOVER-RESPONSE message to VCC AS 158 that includes the VCC AS identifier, the handover number, and the handover command. In one embodiment of the present invention, CS Proxy 132 may forward the MAP PREPARE-HANDOVER-RESPONSE message received from target MSC 118; however, in another embodiment of the present invention, CS Proxy 132 may assemble, and convey to the VCC AS, another MAP PREPARE-HANDOVER-RESPONSE message that includes some or all of the information received from the MSC.

In response to receiving the MAP PREPARE-HANDOVER-RESPONSE message from CS Proxy 132, VCC AS 158 establishes (538-564) a circuit connection with target MSC 118 and, via the MSC, a connection to UE 102 via circuit switched network 110. More particularly, in response to receiving the MAP PREPARE-HANDOVER-RESPONSE message from CS Proxy 132, VCC AS 158 assembles, and conveys (538) to MGCF/MGW 154, a session invitation, preferably a SIP INVITE message, that includes the handover number and routing identifiers associated with UE 102 and the remote party to the communication session. In response to receiving the session invitation, MGCF/MGW 154 provides (540) target MSC 118 with the handover number and reserves trunk circuits for the handoff of the communication session via an exchange of ISUP IAM (Initial Address Message) and ISUP ACM (Address Complete Message) messages. In response to receiving the handover number, target MSC 118 informs (542) VCC AS 158 that the handover is underway, preferably by conveying a SIP PROGRESS message to the VCC AS. In response to receiving the SIP PROGRESS message, VCC AS 158 notifies (544-546) UE 102 that resources are being assigned to the UE in circuit switched network 110, and more particularly at target MSC 118, by conveying a SIP NOTIFY message to the UE via packet data network 120, that is, via EPC 130, in particular Gateway 138, and RAN 122, which message includes the handover command.

Further, in response to receiving the handover request (530), target BSS 112 acquires UE 102 and allocates resources at the BSS to the UE 102. For example, target BSS 112 may page the UE or otherwise instruct the UE to access the BSS. In response to receiving an access attempt from the UE, target BSS 112 allocates resources to the UE notifies (548) target MSC 118 that the BSS has detected UE 102 and that acquisition of the UE is underway, preferably by conveying a HO-DETECTED message to the MSC. In response, target MSC 118 informs (550, 552) VCC AS 158, via packet data network 120, of the detection of UE 102 by circuit switched network 110. That is, target MSC 118 informs (550) CS Proxy 132 of the detection of UE 102 by target BSS 112, that is, of the access attempt by the UE, and that acquisition of the UE is underway, preferably by conveying a MAP PROGRESS-ACCESS-SIGNAL REQUEST message to the CS Proxy. CS Proxy 132 then informs (552) VCC AS 158 of the access attempt and acquisition of the UE, preferably by forwarding the received MAP PROGRESS-ACCESS-SIGNAL REQUEST message to the VCC AS, preferably by encapsulating the MAP message in a SIP message and conveying the SIP message to the VCC AS.

When target BSS 112 has completed acquisition of UE 102, the BSS provides communication session-related services to the UE and informs (554) target MSC 118 of the successful acquisition of the UE, preferably by conveying a HO-COMPLETE message to the MSC. In response to receiving the HO-COMPLETE message, target MSC 118 connects the circuit with UE 102 through the MSC. Further, in response to acquiring UE 102, target BSS 112 informs (556, 558) VCC AS 158, via packet data network 120, of the successful acquisition of UE 102 by circuit switched network 110 and triggers the clearing of resources in packet data network 120. That is, target BSS 112 informs (556) MSC 118 and CS proxy 132 of the successful acquisition of UE 102 by the BSS and triggers a clearing of resources in packet data network 120 by conveying a MAP SEND-END-SIGNAL REQUEST message to the CS Proxy via the MSC. In turn, CS Proxy 132 informs (558) VCC AS 158 of the successful acquisition of UE 102 by circuit switched network 110 and triggers the clearing of resources in packet data network 120 by forwarding the MAP SEND-END-SIGNAL REQUEST message to the VCC AS. In response to receiving the MAP SEND-END-SIGNAL REQUEST message, VCC AS 158 instructs (560-562) UE 102, via packet data network 120 and RAN 122, to terminate the UE's communication session in the packet data network, preferably by conveying a SIP BYE message to the UE via EPC 130, in particular Gateway 138, and RAN 122. In response to receiving the SIP BYE message, UE 102 terminates the UE's bearer connections to packet data network 120.

In addition, in response to being informed of the successful acquisition of UE 102 by target BSS 112, target MSC 118 informs (564) MGCF/MGW 154 of the successful acquisition of the UE, preferably by conveying an ISUP ANSWER message to the MGCF/MGW. MGCF/MGW 154 then informs (566) VCC AS 158 of the acceptance of the handover by circuit switched network 110, preferably by conveying a SIP 200 OK message in response to the session invitation received by the MGCF/MGW from the VCC AS.

At this point, UE 102 has switched over to circuit switched network 110. As a result, it is desirable to tear down resources reserved to the UE 102 in packet data network 120. Therefore, in response to being informed of the acceptance of the handover by circuit switched network 110, VCC AS 158 arranges, via the Circuit Switched Proxy, a release of resources in packet data network 120. That is, VCC AS 158 negotiates (568), via CS Proxy 132, a release of resources allocated to UE 102 in packet data network 120. CS Proxy 132, via MME 134, then negotiates (570) a release of packet data network resources with RAN 122. Target MSC 118 also informs (572) VCC AS 158 that the UE has switched over to circuit switched network 110 and BSS 112 and instructs CS Proxy 132 to release any MAP resources associated with UE 102 by conveying a MAP-SEND-END-SIGNAL RESPONSE message to the CS Proxy, which the CS Proxy forwards (574) to VCC AS 158.

In response to receiving the MAP-SEND-END-SIGNAL RESPONSE message, VCC AS 158 instructs (576) MGCF/MGW 154 to connect the bearer path of the communication session with circuit switched network 110 and to switch to a circuit switched communication session conversion scheme by conveying a SIP RE-INVITE message to the MGCF/MGW. In response to receiving the SIP RE-INVITE message, MGCF/MGW 154 connects the bearer path of the communication session with circuit switched network 110, switches to a circuit switched communication session conversion scheme, and informs (578) VCC AS 158 of the switch and conversion by conveying a SIP 200 OK message to the VCC AS. At this point, a circuit switched bearer path has been established (580-583) between UE 102 and VCC AS 158 via target BSS 112, target MSC 118, and MGCF/MGW 154 and call flow diagram 500 then ends.

By providing a CS Proxy 132 in packet data network 120 that is coupled to MSC 118 of circuit switched network 110, communication system 100 permits the MSC to communicate with the packet switched network and further with an IMS 150 VCC AS 158 via the packet data network. Thus the MSC and VCC AS may exchange circuit switched network messages, and in particular circuit switched network handover messages such as MAP messages, via the packet switched network prior to connections being established in the circuit switched network for the UE being handed off. By permitting MSC 118 and VCC AS 158 to exchange messaging via the packet switched network, communication system 100 facilitates an exchange of handoff-related information between the VCC AS anchoring the call and the target circuit switched network 110, thereby allowing the VCC AS to control the set up of the communication session in the target circuit switched network in preparation for handover.

Figure 6A:
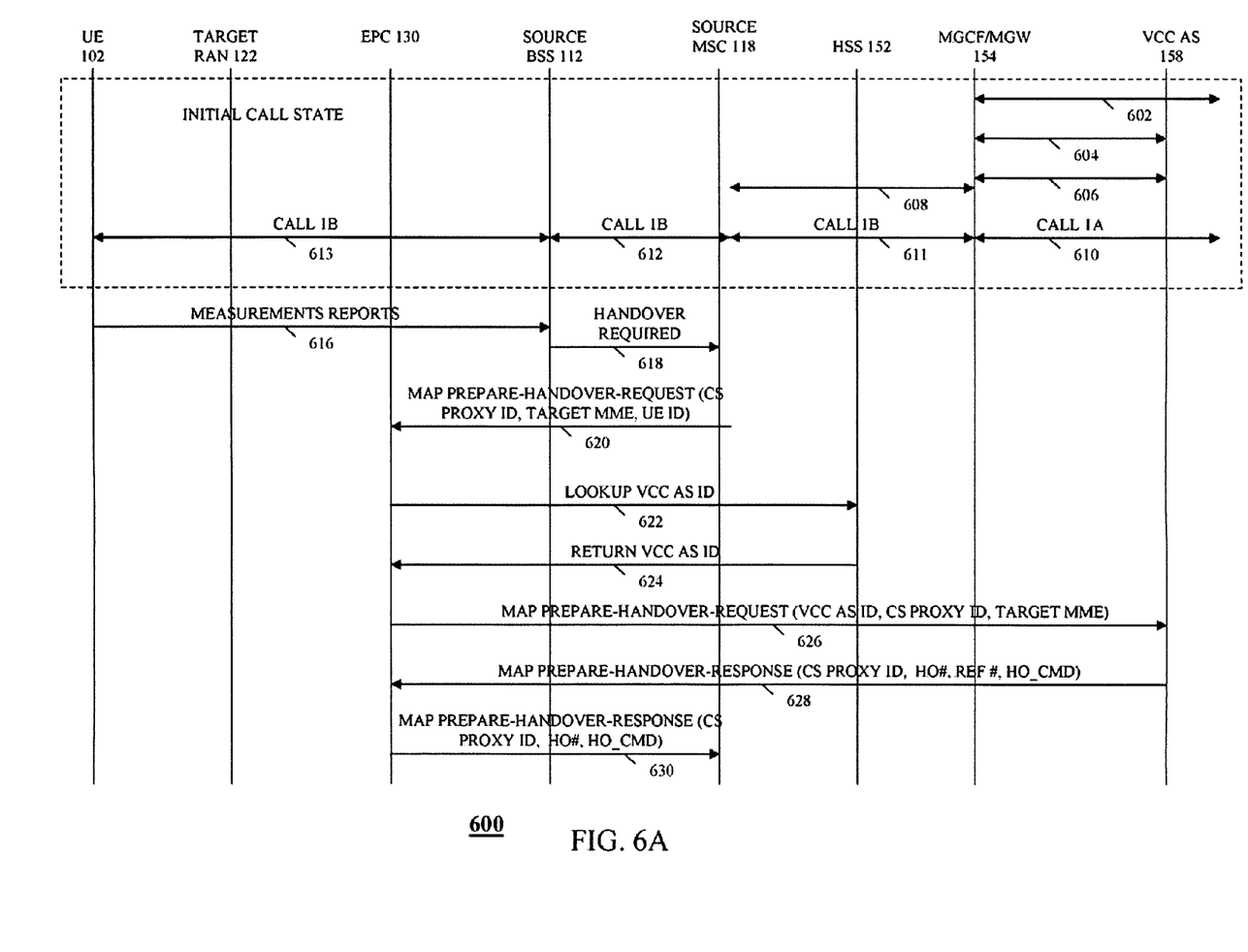
FIG. 6A is a signal flow diagram of a method executed by the communication system of FIG. 1 in handing off a voice call from a circuit switched network of FIG. 1 to a packet data network of FIG. 1 in accordance with various embodiments of the present invention.
Figure 6B:
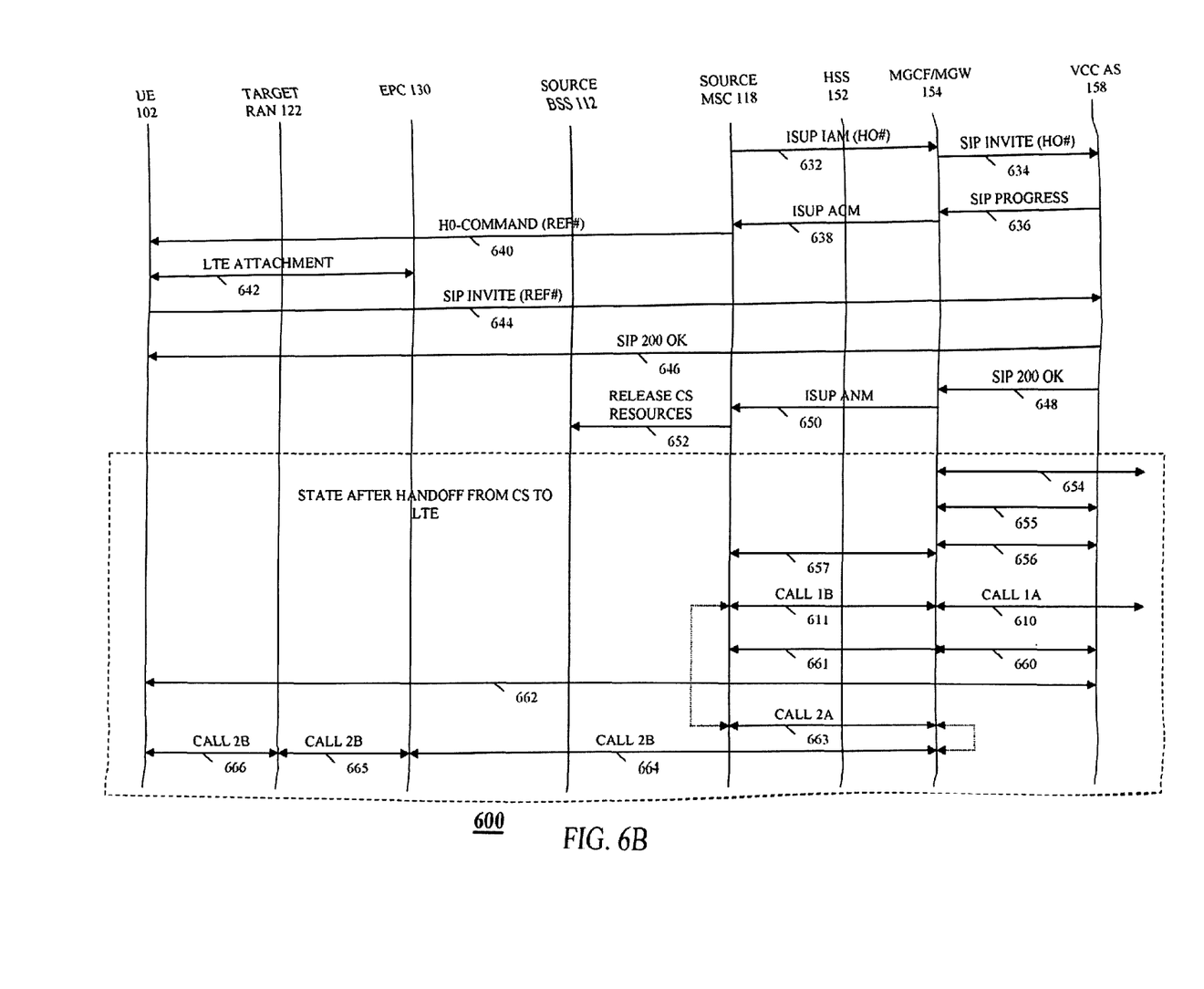
FIG. 6B is a continuation of the signal flow diagram of FIG. 6A depicting a method executed by the communication system of FIG. 1 in handing off a voice call from a circuit switched network of FIG. 1 to a packet data network of FIG. 1 in accordance with various embodiments of the present invention.
Figure 6C:
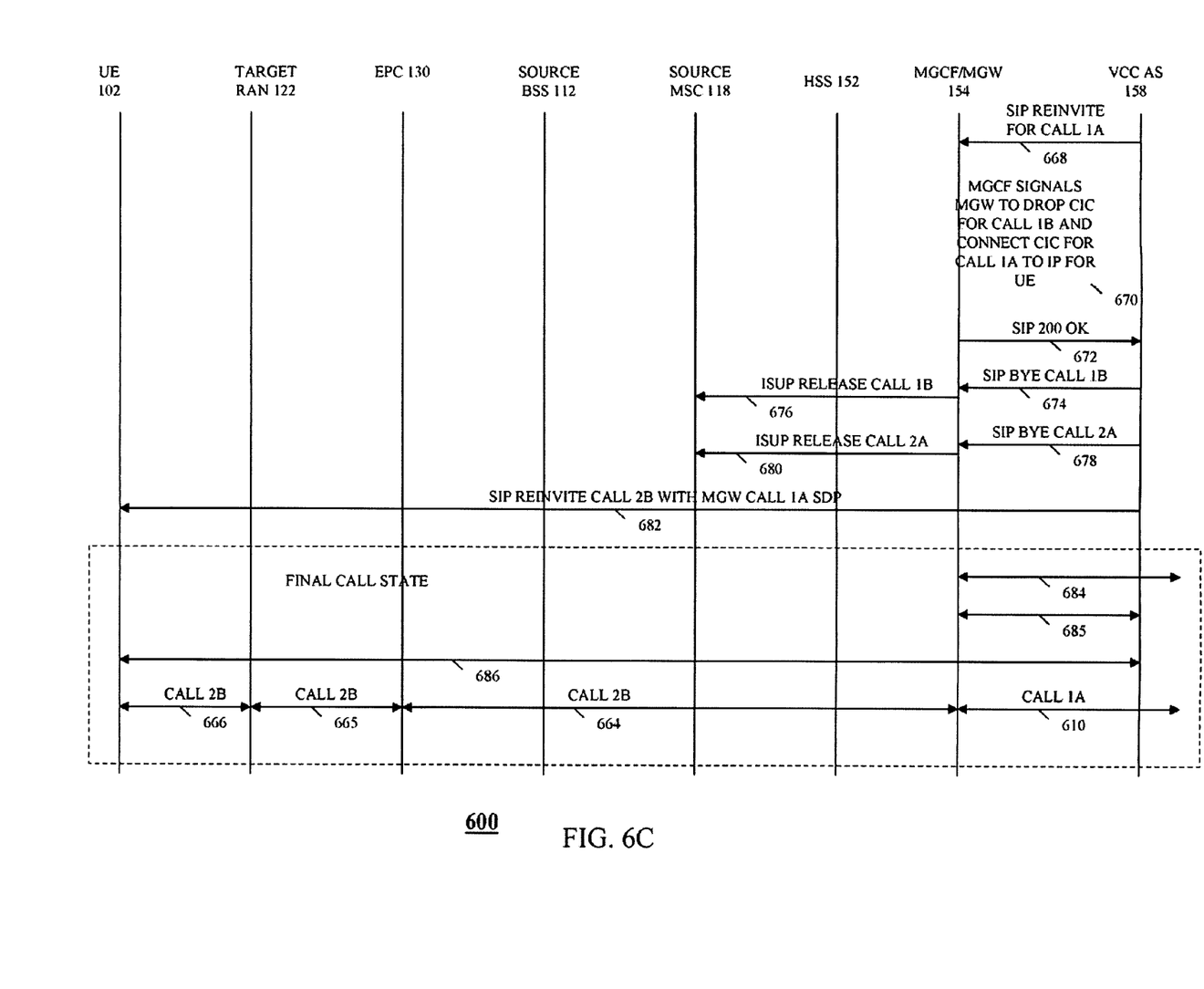
FIG. 6C is a continuation of the signal flow diagrams of FIGS. 6A and 6B depicting a method executed by the communication system of FIG. 1 in handing off a voice call from a circuit switched network of FIG. 1 to a packet data network of FIG. 1 in accordance with various embodiments of the present invention.

CS Proxy 132 further facilitates a handover of a communication session from circuit switched network 110 to packet data network 120. Referring now to FIGS. 6A, 6B, and 6C, a signal flow diagram 600 is provided that illustrates a method executed by communication system 100 in handing off UE 102 from circuit switched network 110 to packet data network 120 in accordance with various embodiments of the present invention. Signal flow diagram 600 begins when UE 102 is engaged (602-613) in a communication session, for example, a voice call, with a remote party (not shown) via circuit switched network 110, which communication session is controlled by IMS 150, and in particular is anchored at VCC AS 158. A signaling path (602-608) and a bearer path (610-613) previously have been established.

In exchanging bearer information, such as voice information, UE 102 exchanges (613) the bearer information, such as vocoded speech, with BSS 112 via air interface 104. In the event of vocoded speech, BSS 112 receives the vocoded speech from UE 102 via a reverse link traffic channel of air interface 104, transcodes the vocoded speech to 64 kbps Pulse Code Modulation (PCM) (G.711), and conveys (612) the transcoded speech to MSC 118. Similarly, BSS 112 may transcode communications received from MSC 118 to a vocoder format compatible with UE 102 and transmits (613) the transcoded information to UE 102 via a forward link traffic channel of air interface 104. MSC 118 forwards (611) the PCM signals received from BSS 112 to MGCG/MGW 154 and forwards (612) PCM signals received from the MGCG/MGW to the BSS. MGCG/MGW 154 transcodes PCM signals received from MSC 102 to vocoded speech, includes the vocoded speech in data packets, preferably formatted in an RTP/UDP/IP format, and routes (610) the data packets to a remote end point (not shown). MGCG/MGW 154 further converts vocoded speech included in data packets received from the remote party to 64 kbps PCM (G.711) and routes (611) the PCM signals to MSC 120. In essence, the communication session may be thought of as having a side associated with UE 102 and communication system 100, that is, CALL 1B (611-613), and a side associated with an external network, for example, a Public Switched Telephone Network (PSTN), and the remote party, that is, CALL 1A (610).

While UE 102 is in an active communication session in circuit switched network 110 (CALL 1B), the UE monitors qualities, in particular a signal strength or alternatively any of a variety of other signal qualities such as a signal-to-noise ratio (SNR), a carrier-to-interference ratio (C/I), pilot power-to-total power (Ec/Io) ratio, a bit error rate (BER), or a frame error rate (FER), of pilots associated with each of BSS 112 of circuit switched network 110 and RAN 122 of packet data network 120. UE 102 may monitor the pilots of each network 110, 120 concurrently or may switch between networks in monitoring the pilots. UE 102 may self-determine when or whether to monitor the pilots associated with RAN 122 of packet data network 120 or may monitor the pilots in response to receiving an instruction to do so from circuit switched network 110, and in particular one of BS 112 and MSC 118.

UE 102 reports (616) the monitored pilot(s) in accordance with well known reporting procedures. For example, when a monitored pilot of circuit switched network 110 exceeds an intra-system handoff threshold, the MS reports this pilot, and the measured pilot channel strength, to BS 112, and in particular to controller 116 via the reverse link of air interface 104. Similarly, when a monitored pilot falls below an intra-system handoff threshold, the MS reports this pilot, and the measured pilot signal strength, to BS 112, and in particular to controller 116, in a report conveyed to the BSS via the reverse link of air interface 104. When a quality of a pilot of packet data network 120, and more particularly of air interface 106, is measured by UE 102 when operating in circuit switched network 110 and exceeds an inter-system handoff threshold, or a quality of a previously reported pilot of circuit switched network 110, and more particularly of air interface 104, is measured by UE 102 when operating in the circuit switched network and falls below an inter-system handoff threshold, the UE reports (616) the monitored pilot(s) back to BS 112, and more particularly controller 116. Controller 116 then stores the reported pilot measurements.

Based on the pilot measurements associated with BS 112 and RAN 122 and reported by UE 102, circuit switched network 110, and in particular source BSS 112 or source MSC 118, may then determine to handoff UE 102 to target packet data network 120 and target RAN 122. For example, when a pilot of BSS 112 compares unfavorably to (is below, in the case of a signal strength threshold) the intra-system handoff threshold and/or a pilot of RAN 122 compares favorably to (exceeds, in the case of a signal strength threshold) the inter-system handoff threshold, this may indicate a desirability of a handoff. By way of another example, costs associated with operating UE 102 on network 110 may be different from the costs associated with operating UE 102 on network 120. In turn, an operator (or operators) of networks 110 and 120 may charge a different fee for use of each network. If packet data network 120 is the lower cost network, a user of UE 102 may program into the MS a directive to operate on the second network 120 whenever a measurement of a pilot associated with the packet data network compares favorably to the inter-system handoff threshold. By way of still another example, for load balancing purposes, for network cost consideration purposes, or due to a need to clear traffic channels in a coverage area in order to facilitate emergency communications, an operator of communication system 100 may find it desirable to move a UE, such as UE 102, that is actively engaged in a communication session in circuit network 110 to packet data network 120 whenever a measurement of a pilot associated with the packet data network compares favorably to the inter-system handoff threshold.

In response to determining to handoff UE 102 from circuit network 110 and BSS 112 to packet data network 120 and RAN 122, BSS 112 assembles a request to handoff the communication session that includes the measurements, an identifier of a target RAN, that is, RAN 122, and an identifier of the UE to be handed off, that is, UE 102, such as an International Mobile Subscription Identity (IMSI). BSS 112 then conveys (618) this request to MSC 118. In response to receiving the handoff request, MSC 118 assembles, and conveys (620) to packet data network 120, and in particular to CS Proxy 132, a message requesting preparation for a handover, preferably a MAP PREPARE-HANDOVER-REQUEST message, that includes an identifier of the CS Proxy, such as a directory number, for example, an E.164 number, or other routing-related information, associated with the CS Proxy, an identifier of a target MME, that is, MME 134, and the UE identifier.

In response to receiving the handover preparation message from circuit switched network 110, that is, from MSC 118, CS proxy 132 determines, and retrieves routing information for, the VCC AS application associated with, that is, serving, UE 102. Preferably, CS Proxy determines the VCC AS application and retrieves associated routing information by conveying (622), to HSS 152, a request to lookup an identifier, such as a directory number, of the VCC AS serving UE 102, that is, VCC AS 158, which request includes the UE's identifier. In response to receiving the request, HSS 152 returns (624) the requested VCC AS identifier to the CS Proxy.

Based on the received VCC AS identifier, CS proxy 132 then requests that VCC AS 158 prepare a handover of UE 102 to packet data network 120, preferably by conveying (626) a MAP PREPARE-HANDOVER-REQUEST message to the VCC AS 158 that includes and identifier of UE 102, the VCC AS identifier, the CS Proxy identifier, and the identifier of the target MME 134. In response to receiving the handover preparation request, VCC AS 158 assigns a handover number (HO#) and a provides a reference number (REF#) of the application running on VCC AS 158 and serving UE 102 and conveys (628), to CS Proxy 132, a response, preferably a MAP PREPARE-HANDOVER-RESPONSE message, that includes the handover number, the reference number, the CS Proxy identifier, and a command to perform the handover (HO_CMD), that is, for the UE to access the target RAN. In turn, CS Proxy 132 forwards (630) the response, that is, the MAP PREPARE-HANDOVER-RESPONSE message, to MSC 118. Alternatively, CS Proxy 132 may assemble and convey to MSC 118, another MAP PREPARE-HANDOVER-RESPONSE message that includes some or all of the information received from VCC AS 158 and that may or may not include the received reference number.

In response to receiving the MAP PREPARE-HANDOVER-RESPONSE message, source MSC 118 directs (632) the handoff to the MGCF/MGW in the domain of the VCC AS, that is, MGCF/MGW 154, and reserves trunk circuits at the MGCF/MGW for the handoff of the communication session, preferably by conveying an ISUP IAM message with the handover number to the MGCF/MGW. In turn, MGCF/MGW 154 informs (634) VCC AS 158 of the handoff, preferably, by conveying a session invitation, preferably a SIP INVITE message, to the VCC AS that includes the handover number. Based on the session invitation, VCC AS 158 determines that the communication session is being moved to the packet data network 120 side of communication system 100 and informs (636, 638) circuit switched network 110 of communication system 100 that a handover to packet data network 120, and in particular RAN 122, is in progress. Preferably VCC AS 158 conveys (636) a SIP PROGRESS message to MGCF/MGW 154. In response to receiving the SIP PROGRESS message, MGCF/MGW 154 informs (638) source MSC 118 that a handover is in progress and that the trunk lines have been reserved for the handover by conveying an ISUP IAM message to the source MSC.

In response to being informed that that a handover to packet data network 120 is in progress, source MSC 118 instructs (640) UE 102, via BSS 112, to access packet data network 120, and in particular target RAN 122, preferably by conveying a handoff command message to the UE that includes the VCC AS application reference number. In response to receiving the instruction, UE 102 accesses (642), and is acquired by, RAN 122 and EPC 130 in accordance with known techniques, for example, in accordance with the 3GPP LTE standards, and more particularly is described in detail in TS (Technical Specification) 23.401 5.3.2 of the 3GPP LTE specifications, and RAN 122 provides communication session-related services to the UE.

In response to successfully accessing RAN 122, UE 102 sets up a communication session with the remote party via packet data network 120 by conveying (644) a session invitation, preferably a SIP INVITE, to VCC AS 158 via the packet data network, that is, target RAN 122 and EPC 130. The session invitation includes an identifier, that is, the reference number, of the application running on VCC AS 158. VCC AS 158 then indicates (646) to UE 102 an acceptance of the session invitation, preferably by conveying a SIP 200 OK message in response to the session invitation. VCC AS 158 further instructs (648) MGCF/MGW 154, preferably via a SIP 200 OK message, to provide linkage for the communication session coming from UE 102 via packet data network 120 to the communication session that came in from the MSC, that is, to CALL 1A (610) and the leg of CALL 1B (611) from the MSC. In response to receiving the instruction, MGCF/MGW 154 links the communication sessions, or calls, and conveys (650) an ISUP ANM message to MSC 118. In response to receiving the ISUP ANM, source MSC 118 verifies that UE 102 is connected to the reserved trunk and, if so, initiates billing. Further, in response to receiving the ISUP ANM message, MSC 118 instructs (652) BSS 112 to release resources associated with UE 102, that is, legs 612 and 613 of CALL 1B.

At this point, the communication session is still looped through the source MSC. The original signaling path (654-657) and bearer path (610-611) for CALL 1A and 1B remain and the signaling path (660-662) and bearer path (663-666) for CALL 2A and 2B have been established That is, at this point, the communication session with the remote party is routed from the remote party to MGCF/MGW 154 (CALL 1A), from the MGCF/MGW to source MSC 118 (leg 611 of CALL 1B), from the MSC back to the MGCF/MGW (leg 663 of the packet data communication session just set up, that is, CALL 2A), and from the MGCF/MGW to UE 102 via packet data network 120, that is, via EPC 130 and RAN 122 (a second leg of the packet data communication session just set up, that is CALL 2B). The routing of the communication session from MGCF/MGW 154 to MSC 118 and back to MGCF/MGW 154, that is, legs 611 (CALL 1B) and leg 663 (CALL 2A), is an undesirable loop in the communication session.

In order to eliminate this looping of bearer and signaling paths, VCC AS 158 re-invites (668) MGCF/MGW 154 to participate in a communication session involving UE 102 and CALL 1A, preferably by conveying a SIP RE-INVITE to the MGCF/MGW that includes an UE 102 Session Description Protocol (SDP) proposal that includes information describing the parties to the session, the media involved, a session identifier, a Circuit Identification Code (CIC) identifying a trunked channel to MSC 118 that is to be dropped (leg 611 of CALL 1B), and other known SDP information. In response to receiving the session re-invitation, the MGCF instructs (670) the MGW to drop the CIC for CALL 1B and further instructs the MGW to connect the CIC associated with CALL 1A to an IP-based communication session for UE 102 via packet data network 120. MGCF/MGW 154, in particular the MGW, further assigns an MGW port for UE 102 to connect to CALL 1A via packet data network 120 and informs (672) VCC AS 158 of the assigned port, preferably by conveying a SIP 200 OK message to the VCC AS.

VCC AS 158 further arranges a removal of MSC 118 from signaling and bearer paths of the communication session by instructing MSC 118 to drop out of the communication session and MGCF/MGW 158 to release the legs associated with CALLS 1B and 2A (legs 611 and 663). VCC AS 158 conveys (674, 678), to the MGCF/MGW, a first SIP BYE message for CALL 1B and a second SIP BYE message for CALL 2A. In response to receiving the first SIP BYE message, MGCF requests that the MGW remove a remaining termination from the bearer path of CALL 1B, thus removing the MGW from the bearer path of the circuit switched communication session and, further, requests (676) that MSC 118 release linkages allocated by the MSC for routing the communication session via circuit switched network 110 to UE 102, preferably by conveying an ISUP RELEASE CALL 1B message to the MSC. In response to receiving the second SIP BYE message, MGCF requests that the MGW remove a termination from the bearer path of CALL 2A, thus removing the MGW from the bearer path of the CALL 2A leg of the packet data network communication session and, further, requests (680) that MSC 118 release linkages allocated for routing the communication session back to MGCF/MGW 154 as part of CALL 2A, preferably by conveying an ISU: RELEASE CALL 2A message to the MSC.

In addition, VCC AS 158 further arranges for the direct connection of CALL 2B (legs 664-666) with CALL 1A (610) by conveying (682) a session invitation, preferably a SIP RE-INVITE, to UE 102 providing the MGW port number associated with the CIC for CALL 1A and SDP information for CALL 1A. In response to receiving the SIP RE-INVITE, UE 102 arranges for coupling of the communication session to the provided MGW port number and a bearer path is then established (664-666) with the remote party via target RAN 122, EPC 130, and MGCF/MGW 154. The bearer path of CALLs 1A (610) and 2B (664-666) and the signaling path of CALLs 1A (684-685) and 2B (686) now are connected and circuit switched network 110 is no longer involved, and signal flow diagram 600 then ends.

By including a CS Proxy 132 in packet data network 120, communication system 100 allows the packet data network to communicate with VCC AS 158 of IMS 150, MSC 118 of circuit switched network 110 to communicate with the packet data network, and the MSC to communicate with the VCC AS via the packet data network, thereby facilitating an exchange of handoff-related information between the packet data network and the VCC AS, the packet data network and the circuit switched network, and the circuit switched network and the VCC AS via the packet data network.

While the present invention has been particularly shown and described with reference to particular embodiments thereof, it will be understood by those skilled in the art that various changes may be made and equivalents substituted for elements thereof without departing from the scope of the invention as set forth in the claims below. Accordingly, the specification and figures are to be regarded in an illustrative rather then a restrictive sense, and all such changes and substitutions are intended to be included within the scope of the present invention.

Benefits, other advantages, and solutions to problems have been described above with regard to specific embodiments. However, the benefits, advantages, solutions to problems, and any element(s) that may cause any benefit, advantage, or solution to occur or become more pronounced are not to be construed as a critical, required, or essential feature or element of any or all the claims. As used herein, the terms "comprises," "comprising," or any variation thereof, are intended to cover a non-exclusive inclusion, such that a process, method, article, or apparatus that comprises a list of elements does not include only those elements but may include other elements not expressly listed or inherent to such process, method, article, or apparatus. The terms 'including' and/or 'having', as used herein, are defined as comprising. Furthermore, unless otherwise indicated herein, the use of relational terms, if any, such as first and second, top and bottom, and the like are used solely to distinguish one entity or action from another entity or action without necessarily requiring or implying any actual such relationship or order between such entities or actions. An element preceded by ". . . a" does not, without more constraints, preclude the existence of additional identical elements in the process, method, article, or apparatus.

What is claimed is:

1. A method for inter-technology handoff of a communication session in a communication system comprising an Internet Protocol Multimedia Subsystem (IMS) capable of communicating with a user equipment via each of an intervening packet data network and an intervening circuit switched network, the method comprising:
conveying forward link session traffic to, and receiving reverse link session traffic from, a user equipment via the packet data network;
determining to hand off the communication session;
in response to determining to hand off the communication session to the circuit switched network, conveying, by a Circuit Switched Proxy of the packet data network to the user equipment, information concerning a target Mobile Switching Center of the circuit switched network;
conveying, by the user equipment to a Voice Call Continuity Application Server of the IMS and via the packet data network, a target cell identity and a Mobile Switching Center identity;
instructing, by the Voice Call Continuity Application Server via the Circuit Switched Proxy of the packet data network, the target Mobile Switching Center to prepare for a handover, wherein instructing comprises conveying a Mobile Application Part message by the Voice Call Continuity Application Server to the Circuit Switched Proxy and conveying a Mobile Application Part message by the Circuit Switched Proxy to the target Mobile Switching Center;
continuing to anchor the session in the Voice Call Continuity Application Server;
acquiring, by a target Base Station Subsystem associated with the target Mobile Switching Center, the user equipment; and
providing, by the target Base Station Subsystem, the user equipment with communication session services.

2. The method of claim 1, further comprising conveying, by the Mobile Switching Center, handover-related information to the Voice Call Continuity Application Server via the Circuit Switched Proxy.

3. The method of claim 2, wherein conveying, by the Mobile Switching Center, handover-related information to the Voice Call Continuity Application Server via the circuit switched proxy comprises conveying a Mobile Application Part message by the Mobile Switching Center to the Circuit Switched Proxy and conveying a Mobile Application Part message by the Circuit Switched Proxy to the Voice Call Continuity Application Server.

4. The method of claim 1, further comprising notifying the user equipment, by the Voice Call Continuity Application Server via the packet data network, of the assignment of resources to the user equipment in the circuit switched network.

5. The method of claim 1, further comprising notifying the Voice Call Continuity Application Server, by the target Base Station Subsystem via the Circuit Switched Proxy, of the acquisition of the user equipment by the circuit switched network.

6. The method of claim 5, further comprising, in response to receiving notification of the acquisition of the user equipment by the circuit switched network, instructing the user equipment to terminate the communication session in the packet data network.

7. The method of claim 5, further comprising, in response to receiving notification of the acquisition of the user equipment by the circuit switched network, arranging, by the Voice Call Continuity Application Server via the Circuit Switched Proxy, a release of resources in the packet data network.

8. The method of claim 5, further comprising instructing, by the Voice Call Continuity Application Server, a gateway to connect a bearer path of the communication session with the circuit switched network.

9. A method for inter-technology handoff of services in a communication system comprising an Internet Protocol Multimedia Subsystem capable of communicating with a user equipment via each of an intervening packet data network and an intervening circuit switched network, the method comprising:
conveying forward link service traffic to, and receiving reverse link service traffic from, an user equipment via the circuit switched network;
determining to hand off a communication session;

in response to determining to hand off the communication session, conveying, by a Base Station Subsystem of the circuit switched network to a Mobile Switching Center of the circuit switched network, a request to hand off the communication session to the packet data network;

in response to receiving the handoff request, conveying, by the Mobile Switching Center to a Circuit Switched Proxy of the packet data network, a request to prepare for a handoff;

exchanging handover information by the Circuit Switched Proxy with a Voice Call Continuity Application Server of the Internet Protocol Multimedia Subsystem;

providing, by the Circuit Switched Proxy to the Mobile Switching Center, handover information received from the Voice Call Continuity Application Server, wherein providing comprises an exchange of Mobile Application messages between the Voice Cal Continuity Application Server and the Circuit Switched Proxy and between the Circuit Switched Proxy and the Mobile Switching Center;

continuing to anchor the session in the Voice Call Continuity Application Server;

instructing, by the circuit switched network, the user equipment to access the packet data network;

acquiring the user equipment by a Radio Access Network of the packet data network; and providing, by the packet data network, the user equipment with services.

10. The method of claim 9, further comprising removing the Mobile Switching Center from one or more of a bearer path of the communication session and a signaling path of the communication session.

11. The method of claim 9, further comprising, subsequent to acquiring the user equipment by the Radio Access Network of the packet data network, removing a loop in the communication session between the Mobile Switching Center and a gateway.

12. The method of claim 9, wherein conveying, by the Mobile Switching Center to a Circuit Switched Proxy, a request to prepare for a handoff comprises conveying a Mobile Application Part message.

13. The method of claim 9, wherein exchanging handover information by the Circuit Switched Proxy with the Voice Call Continuity Application Server comprises, in response to receiving the request to prepare for a handoff, determining, by the Circuit Switched Proxy, a Voice Call Continuity Application Server application associated with the user equipment.

14. The method of claim 9, wherein exchanging handover information by the Circuit Switched Proxy with the Voice Call Continuity Application Server comprises, in response to receiving the request to prepare for a handoff, requesting, by the Circuit Switched Proxy, that the Voice Call Continuity Application Server prepare a handoff of the user equipment.

15. The method of claim 9, wherein exchanging handover information by the Circuit Switched Proxy with the Voice Call Continuity Application Server comprises conveying a Mobile Application Part message to the Voice Call Continuity Application Server.

16. A system for facilitating an inter-technology handoff of a communication session in a communication system comprising an Internet Protocol Multimedia Subsystem (IMS) capable of communicating with a user equipment via each of an intervening packet data network and an intervening circuit switched network, wherein the communication session is anchored at an Internet Protocol Multimedia Subsystem Voice Call Continuity Application Server, the system comprising:

a source Base Station Subsystem (BSS) for conveying forward link session traffic to, and receiving reverse link session traffic from, a user equipment via the packet data network, wherein the BSS determines whether to hand off the communication session to the circuit switched network;

a Circuit Switched Proxy capable of operating in the packet data network, wherein the Circuit Switched Proxy conveys to the user equipment, based upon the determination to hand off the communication session to the circuit switched network, information concerning a target Mobile Switching Center of the circuit switched network, further wherein the user equipment further conveys to a Voice Call Continuity Application Server of the IMS via the packet data network a target cell identity and a Mobile Switching Center identity, and further wherein the Voice Call Continuity Application Server instructs the target Mobile Switching Center via the Circuit Switched Proxy of the packet data network to prepare for a handover, and wherein preparing for handover comprises an exchange of Mobile Application Part messages between the Voice Call Continuity Application Server and the Circuit Switched Proxy and between the Circuit Switched Proxy and the Mobile Switching Center; and a target BSS associated with the target Mobile Switching Center for acquiring the user equipment, wherein the target BSS provides the user equipment with communication session services, wherein, the Voice Call Continuity Application Server continues to anchor the communication session.

17. The system of claim 16, wherein the Circuit Switched Proxy is one or more of implemented by a Mobility Management Entity and implemented as a stand alone network entity with interface to a Mobility Management Entity, a Mobile Switching Center, and an Internet Protocol Multimedia Subsystem.

18. The system of claim 16, wherein the Circuit Switched Proxy supports one or more of an E interface for the exchange of inter-mobile switching center signaling with the Mobile Switching Center, an SGx interface for the exchange of handover-related signaling with the Internet Protocol Multimedia Subsystem, and an S6x interface for retrieving Voice Call Continuity Application Server information from the Home Subscriber Server.

19. The system of claim 16, wherein the Circuit Switched Proxy comprises a processor that is adapted to exchange inter-mobile switching center signaling with a Mobile Switching Center of the circuit switched network and to exchange handover-related signaling with the Voice Call Continuity Application Server.

20. The system of claim 19, wherein the processor is adapted to exchange inter-mobile switching center signaling and handover-related signaling via Mobile Application Part messaging.

21. The apparatus of claim 19, wherein the Mobile Switching Center supports an E interface for the exchanging inter-mobile switching center signaling with the Circuit Switched Proxy.

22. A system for inter-technology handoff of services in a communication system comprising an Internet Protocol Multimedia Subsystem (IMS) capable of communicating with a user equipment via each of an intervening packet data network and an intervening circuit switched network, wherein the communication session is anchored at an Internet Protocol Multimedia Subsystem Voice Call Continuity Application Server, the system comprising:

a base station subsystem (BSS) of the circuit switched network for conveying forward link service traffic to, and receiving reverse link service traffic from, an user equipment via the circuit switched network, wherein the BSS determines whether to hand off the communication session, further wherein the BSS conveys to a Mobile Switching Center of the circuit switched network a request to hand off the communication session to the packet data network based upon the determination to hand off the communication session,;

a Mobile Switching Center for conveying to a Circuit Switched Proxy of the packet data network a request to prepare for a handoff based upon receiving the handoff request, wherein the Circuit Switched Proxy exchanges handover information with the Voice Call Continuity Application Server, further wherein the Circuit Switched Proxy provides to the Mobile Switching Center handover information received from the Voice Call Continuity Application Server wherein providing handover information comprises an exchange of Mobile Application Part messages between the Voice Call Continuity Application Server and the Circuit Switched Proxy and between the Circuit Switched Proxy and the Mobile Switching Center, and further wherein the circuit switched network instructs the user equipment to access the packet data network; and a Radio Access Network of the packet data network for acquiring the user equipment, wherein the packet data network provides the user equipment with services, and further wherein the Voice Call Continuity Application Server continues to anchor the communication session.

23. The system of claim 22, wherein the Voice Call Continuity Application Server is further adapted to, as part of a handover of the user equipment from the packet data network to the circuit switched network and in response to receiving notification of the acquisition of the user equipment by the circuit switched network, arrange, via the Circuit Switched Proxy, a release of resources in the packet data network.

24. The system of claim 23, wherein the Voice Call Continuity Application Server is further adapted to, as part of a handover of the user equipment from the packet data network to the circuit switched network and in response to receiving notification of the acquisition of the user equipment by the circuit switched network, instruct a gateway to connect a bearer path of the communication session with the circuit switched network.

25. The system of claim 22, wherein the Voice Call Continuity Application Server is further adapted to, as part of a handover of the user equipment from the circuit switched network to the packet data network, arrange a removal of the Mobile Switching Center from one or more of a bearer path of the communication session and a signaling path of the communication session.

26. The system of claim 22, wherein the Voice Call Continuity Application Server is further adapted to, as part of a handover of the user equipment from the circuit switched network to the packet data network and subsequent to an acquisition of the user equipment by the packet data network, arrange a removal of a loop in the communication session between the Mobile Switching Center and a gateway.

27. The method of claim 1, wherein the Circuit Switched Proxy is included in an Evolved Packet Core of the packet data network.

28. The method of claim 9, wherein the Circuit Switched Proxy is included in an Evolved Packet Core of the packet data network.

29. The system of claim 16, wherein the Circuit Switched Proxy is an element of an Evolved Packet Core of the packet data network.

30. A method for inter-technology handoff of a communication session in a communication system comprising an Internet Protocol Multimedia Subsystem (IMS) capable of communicating with a user equipment via each of an intervening packet data network and an intervening circuit switched network, the method comprising:

conveying forward link session traffic to, and receiving reverse link session traffic from, a user equipment via the packet data network;

determining to hand off the communication session;

in response to determining to hand off the communication session to the circuit switched network, conveying, by a Circuit Switched Proxy of the packet data network to the user equipment, information concerning a target Mobile Switching Center of the circuit switched network;

conveying, by the user equipment to a Voice Call Continuity Application Server of the IMS and via the packet data network, a target cell identity and a Mobile Switching Center identity;

instructing, by the Voice Call Continuity Application Server via the Circuit Switched Proxy of the packet data network, the target Mobile Switching Center to prepare for a handover;

continuing to anchor the session in the Voice Call Continuity Application Server;

acquiring, by a target Base Station Subsystem associated with the target Mobile Switching Center, the user equipment;

providing, by the target Base Station Subsystem, the user equipment with communication session services;

notifying the Voice Call Continuity Application Server, by the target Base Substation via the Circuit Switched Proxy, of the acquisition of the user equipment of the user equipment by the circuit switched network; and in response to receiving notification of the acquisition of the user equipment by the circuit switched network, instructing the user equipment to terminate the communication session in the packet data network.

* * * * *